United States Patent
Marwah et al.

(10) Patent No.: US 11,263,104 B2
(45) Date of Patent: Mar. 1, 2022

(54) MAPPING BETWEEN RAW ANOMALY SCORES AND TRANSFORMED ANOMALY SCORES

(71) Applicant: ENTIT SOFTWARE LLC, Sanford, NC (US)

(72) Inventors: Manish Marwah, Palo Alto, CA (US); Andrey Simanovsky, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 307 days.

(21) Appl. No.: 16/426,850

(22) Filed: May 30, 2019

(65) Prior Publication Data

US 2020/0379863 A1    Dec. 3, 2020

(51) Int. Cl.
*G06F 11/30* (2006.01)
*G06K 9/62* (2022.01)
*G06F 11/34* (2006.01)

(52) U.S. Cl.
CPC ...... *G06F 11/3096* (2013.01); *G06F 11/3452* (2013.01); *G06K 9/6262* (2013.01)

(58) Field of Classification Search
CPC ............. G06F 11/079; G06F 11/0706; G06F 11/0754; G06F 2201/86; G06F 11/3096; G06F 11/3452; G06F 11/3006; G06F 11/3438; G06K 9/6262
See application file for complete search history.

(56) References Cited

U.S. PATENT DOCUMENTS

| | | | | |
|---|---|---|---|---|
| 7,406,653 B2* | 7/2008 | Ide | ................... | G06F 16/35 714/799 |
| 8,504,876 B2* | 8/2013 | Mork | ................... | G06F 16/2453 714/37 |
| 9,264,442 B2* | 2/2016 | Bart | ................... | H04L 63/1425 |
| 9,298,538 B2* | 3/2016 | Marvasti | ............. | G06F 11/0706 |
| 9,324,119 B2 | 4/2016 | Singh et al. | | |
| 9,336,484 B1 | 5/2016 | Iverson | | |
| 9,349,103 B2 | 5/2016 | Eberhardt et al. | | |
| 9,361,463 B2* | 6/2016 | Ferragut | ............... | G06F 21/552 |

(Continued)

OTHER PUBLICATIONS

Entit Software LLC., U.S. Appl. No. 15/959,461 entitled Unauthorized Authentication Event Detection filed Apr. 23, 2018 (30 pages).
Etoty. Renee E et al., A Survey of Visualization Tools Assessed for Anomaly-Based Intrusion Detection Analysis, Army Research Lab Adelphi Md Computational and Information Sciences Directorate, ADA601590. Apr. 2014 (50 pages).

(Continued)

*Primary Examiner* — Amine Riad

(57) ABSTRACT

In some examples, a system is to, given an anomaly score threshold over which at least one anomalous point is to be observed in a test set of points with a specified probability, determine, using raw anomaly scores for a training set of points, a first mapping between raw anomaly scores in a first range and first transformed anomaly scores using a first transformation technique. The system is to determine, using the raw anomaly scores for the training set of points, a second mapping between raw anomaly scores in a second range greater than the first range and second transformed anomaly scores using a second transformation technique different from the first transformation technique. The system is to use the first mapping and the second mapping to detect an anomaly in a computing environment based on the test set of points.

20 Claims, 4 Drawing Sheets

(56) References Cited

U.S. PATENT DOCUMENTS

| | | | |
|---|---|---|---|
| 9,378,462 B2* | 6/2016 | Davidoff | G06N 7/005 |
| 10,043,006 B2 | 8/2018 | Puri et al. | |
| 10,594,710 B2* | 3/2020 | Wright | H04L 63/1425 |
| 10,701,093 B2* | 6/2020 | Dean | H04L 63/1425 |
| 11,012,458 B2* | 5/2021 | Wright | H04L 63/1425 |
| 2003/0236652 A1* | 12/2003 | Scherrer | G06F 21/552 |
| | | | 703/2 |
| 2015/0020207 A1* | 1/2015 | Kasiviswanathan | G06F 21/60 |
| | | | 726/26 |
| 2015/0205692 A1* | 7/2015 | Seto | G06F 11/008 |
| | | | 702/182 |
| 2016/0042287 A1* | 2/2016 | Eldardiry | G06Q 50/00 |
| | | | 706/14 |
| 2016/0147583 A1* | 5/2016 | Ben Simhon | H04L 43/0823 |
| | | | 714/47.3 |
| 2016/0217022 A1 | 7/2016 | Velipasaoglu et al. | |
| 2016/0328654 A1 | 11/2016 | Bauer et al. | |
| 2018/0083988 A1 | 3/2018 | Kataoka et al. | |
| 2018/0219888 A1 | 8/2018 | Apostolopoulos | |
| 2018/0241761 A1 | 8/2018 | Bania et al. | |
| 2018/0241762 A1 | 8/2018 | Savalle et al. | |
| 2018/0302423 A1 | 10/2018 | Muddu et al. | |
| 2018/0324199 A1 | 11/2018 | Crotinger et al. | |
| 2018/0336353 A1 | 11/2018 | Manadhata et al. | |
| 2019/0065738 A1 | 2/2019 | Kim et al. | |
| 2019/0253504 A1* | 8/2019 | Wang | H04L 67/22 |
| 2019/0318421 A1* | 10/2019 | Lyonnet | G06N 20/20 |
| 2019/0334786 A1* | 10/2019 | Dutta | G06F 11/3006 |
| 2020/0349470 A1* | 11/2020 | Ikeda | G06N 3/088 |
| 2021/0073063 A1* | 3/2021 | Kale | G06F 3/0619 |
| 2021/0110282 A1* | 4/2021 | McCann | G06F 11/0778 |

OTHER PUBLICATIONS

Gamachchi, Anagi et al., A Graph Based Framework for Malicious Insider Threat Detection, 2017 (10 pages).

Gates, Christopher S. et al., IEEE, Generating Summary Risk Scores for Mobile Applications, 2014 (14 pages).

Goldstein et al., PLOS One, A Comparative Evaluation of Unsupervised Anomaly Detection Algorithms for Multivariate Data, Apr. 19, 2018 (17 pages).

Hoeting, Jennifer A. et al. "Bayesian model averaging: a tutorial." Statistical science (1999): 382-401.

Jiang, Heju et al., Instart Logic, Inc., A Recommender System for Efficient Discovery of New Anomalies in Large-Scale Access Logs, Oct. 25, 2016 (9 pages).

Marwah et al., U.S. Appl. No. 16/426,862 entitled Aggregating Anomaly Scores From Anomaly Detectors filed May 30, 2019 (30 pages).

Mindtools, Risk Impact/Probability Chart, 2018 (4 pages).

Peng H. et al., Using probabilistic generative models for ranking risks of android apps, in CCS, 2012 (12 pages).

Rayana, Shebuti et al., Less is More: Building Selective Anomaly Ensembles, ACM Transactions on Knowledge Discovery from Data, vol. X, No. X, Article X, Publication date: Apr. 2016 (33 pages).

Simanovsky, et al., U.S. Appl. No. 16/426,856 entitled Visualizations Representing Points Corresponding to Events filed May 30, 2019 (33 pages).

Syarif, Iwan et al., Unsupervised Clustering Approach for Network Anomaly Detection, Conference Paper—Apr. 2012 (12 pages).

Wikipedia, Variation of information last edited Oct. 10, 2018 (2 pages).

* cited by examiner

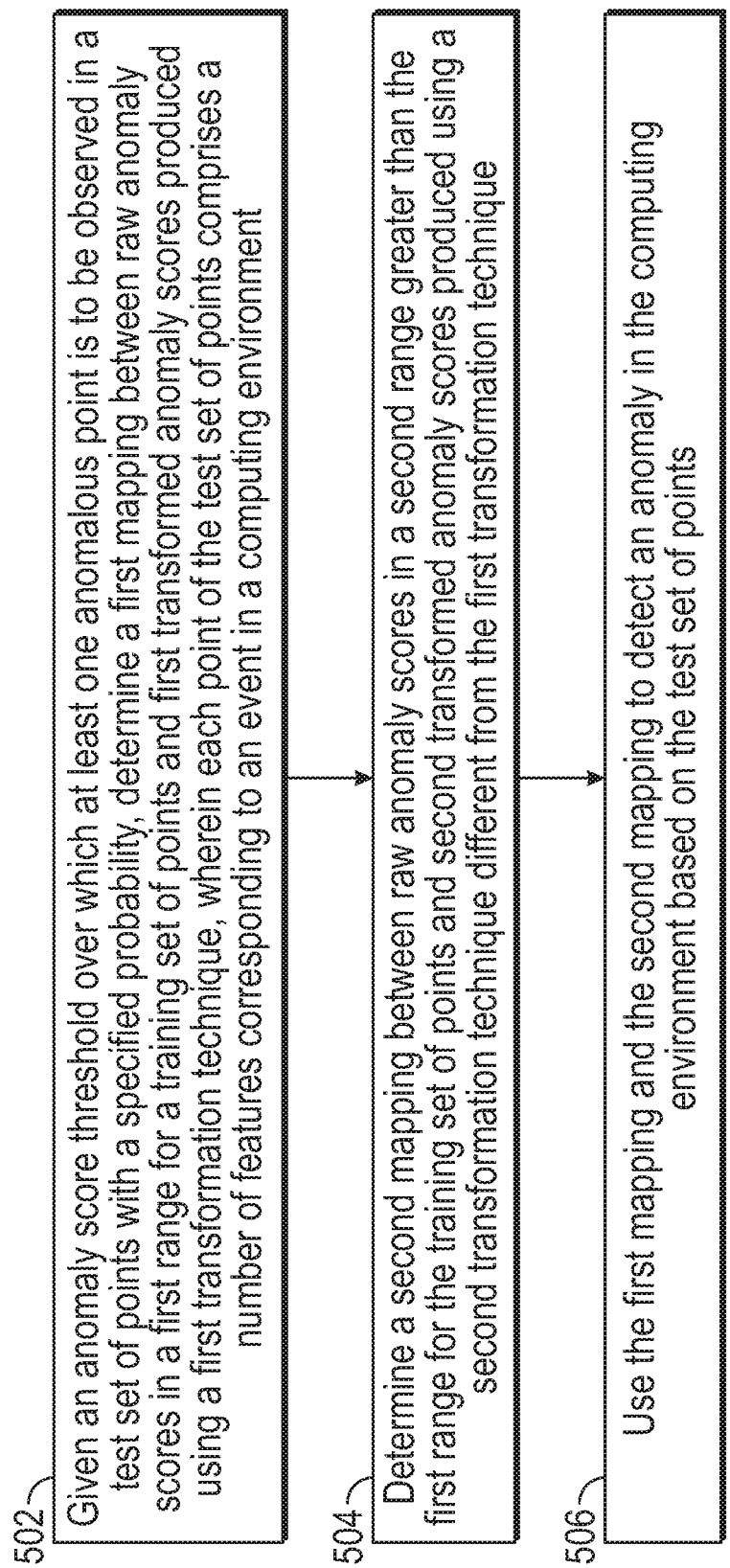

502 — Given an anomaly score threshold over which at least one anomalous point is to be observed in a test set of points with a specified probability, determine a first mapping between raw anomaly scores in a first range for a training set of points and first transformed anomaly scores produced using a first transformation technique, wherein each point of the test set of points comprises a number of features corresponding to an event in a computing environment 504 — Determine a second mapping between raw anomaly scores in a second range greater than the first range for the training set of points and second transformed anomaly scores produced using a second transformation technique different from the first transformation technique 506 — Use the first mapping and the second mapping to detect an anomaly in the computing environment based on the test set of points

FIG. 5

MAPPING BETWEEN RAW ANOMALY SCORES AND TRANSFORMED ANOMALY SCORES

BACKGROUND

A computing environment can include a network of computers and other types of devices. Issues can arise in the computing environment due to behaviors of various entities. Monitoring can be performed to detect such issues, and to take remedial actions to address the issues.

BRIEF DESCRIPTION OF THE DRAWINGS

Some implementations of the present disclosure are described with respect to the following figures.

FIG. 5 is a flow diagram of a process according to some examples.

Figure 1:
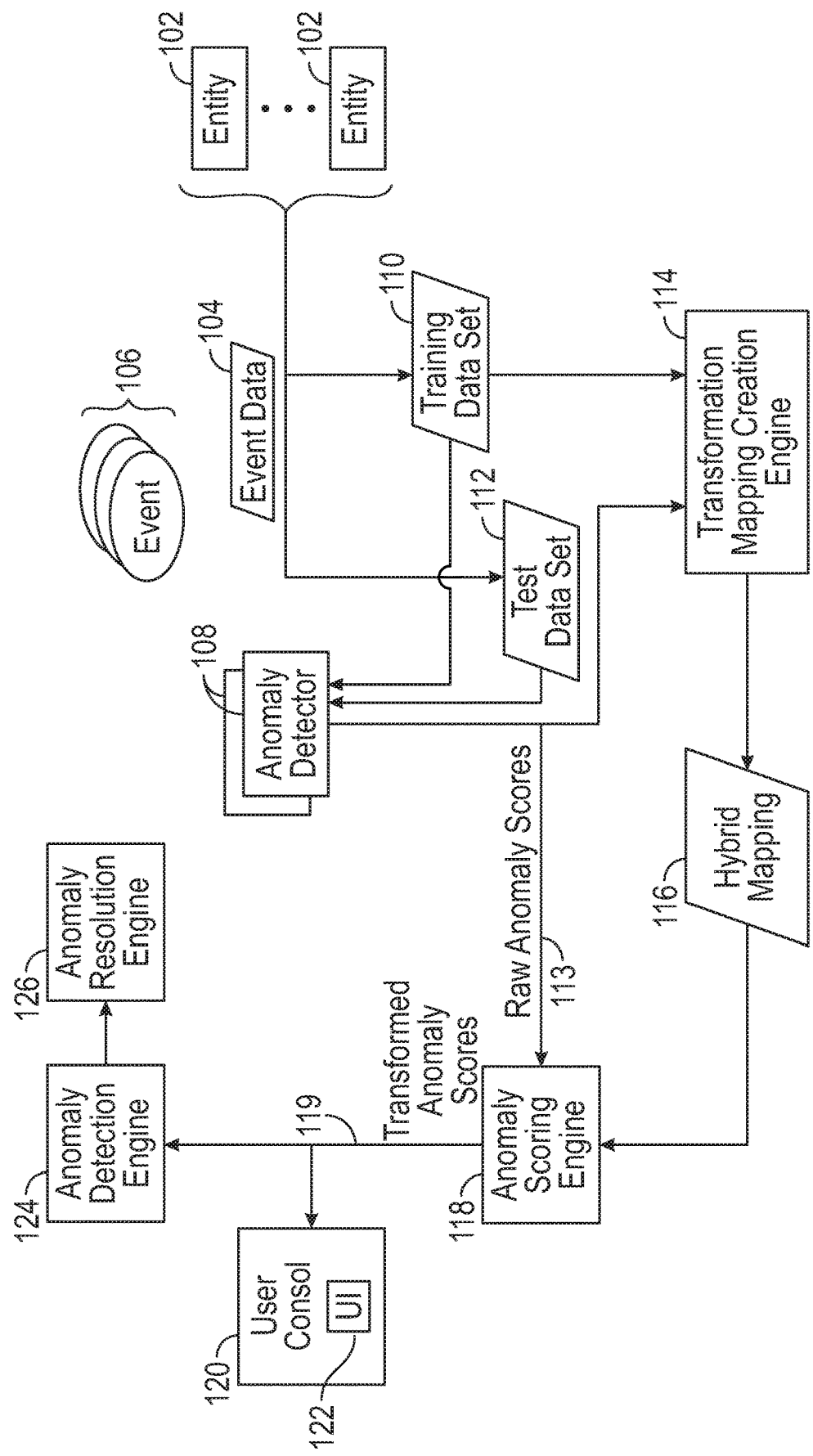
FIG. 1 is a block diagram of an arrangement including an anomaly score transformation engine and an anomaly detection engine according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Certain events (or collections of events) due to behaviors of entities in a computing environment can be considered anomalous. Examples of entities can include users, machines (physical machines or virtual machines), programs, sites, network addresses, network ports, domain names, organizations, geographical jurisdictions (e.g., countries, states, cities, etc.), or any other identifiable element that can exhibit a behavior including actions in the computing environment. A behavior of an entity can cause an anomalous event if the behavior deviates from an expected rule, criterion, threshold, policy, past behavior of the entity, behavior of other entities, or any other target, which can be predefined or dynamically set.

An example of an anomalous behavior of a user involves the user making greater than a number of login attempts into a computer within a specified time interval, or a number of failed login attempts by the user within a specified time interval. An example of an anomalous behavior of a machine or program (e.g., an application program, an operating system, a firmware, a malware, etc.) involves the machine or program receiving or sending greater than a threshold number of data packets (such as due to a port scan or a denial-of-service attack) within a specified time interval, or a number of login attempts by users on the machine that exceed a threshold within a specified time interval. Another example of an anomalous behavior includes exfiltration, which involves the unauthorized transfer or copying of data from a network or machine to a destination outside the network or machine.

To identify issues due to anomalous behavior in a computing environment (e.g., a network, a machine, a collection of machines, a program, a collection of programs, etc.), information of activities (in the form of data packets, requests and responses, etc.) can be analyzed. Issues due to anomalous behaviors can be referred to as "anomalies," which can include any or some combination of: a security attack of a system, a threat that can cause an error, reduced performance of a machine or program (or a collection of machines or programs), stolen or other unauthorized access of information, and so forth.

An activity or a collection of activities can be referred to as an "event." Some events may correspond to an anomaly, while other events may not be considered anomalous. For each event, a number of features can be collected, where a "number of features" can refer to one feature or to multiple features. A "feature" can refer to any attribute that is representative of an aspect associated with an event. Examples of features can include any or some combination of: a user name, a program name, a network address, a metric relating to a usage or performance of a machine or program, a metric relating to an action of an entity (such as a user, machine, or program), and so forth.

Anomaly detectors can be used to produce anomaly scores for respective events or entities (or more specifically, for respective collections of a number of features). An "anomaly score" refers to a value that indicates a degree of anomalousness of an event or entity. For example, the anomaly score can include a probability that a given event or entity is anomalous. The anomaly detectors may be trained (such as by using machine learning) to produce anomaly scores for events or entities. For example, the anomaly detector can be trained using a training set of points, where a "point" can refer to a collection of features. With unsupervised training, a training set of points do not include anomaly scores. With supervised training, a training set of points can include anomaly scores (labels) associated with the respective points of the training set of points.

Raw anomaly scores (e.g., probability values) produced by anomaly detectors may not be easily understood by security analysts for ascertaining whether events or entities are anomalous. In some examples, raw anomaly scores for the training set of points may be linearly mapped to anomaly scores within a specific range, such as between 0 and 100 or between 0 and 1. In such examples, the largest raw anomaly score can be mapped to the maximum value (100 or 1) of the specific range of mapped anomaly scores. If the distribution of raw anomaly scores is not uniform (e.g., raw anomaly scores may be bunched together within a given range or ranges, while raw anomaly scores outside the given range or ranges are sparse), the foregoing linear mapping may result in too few or too many mapped anomaly scores having high score values (e.g., close to 100 or 1).

Additionally, a mapping produced based on raw anomaly scores for a training set of points may not account for larger raw anomaly scores that may not be present in the training set of points, but which may be present in a test set of points. A "test set of points" refers to points observed during operation of a computing environment, and for which a determination is to be made regarding whether an anomalous event or entity is indicated by the test set of points. Raw anomaly scores produced for the test set of points (such as by anomaly detectors) may include large raw anomaly scores not present in the training set of points. Thus, if a linear mapping naively maps the largest raw anomaly score of the training set of points to a maximum value of the specific range of mapped anomaly scores, then if a raw anomaly score larger than the largest raw anomaly score of the training set of points is observed for the test set of points, then the linear mapping would not leave sufficient room to map such larger raw anomaly score observed for the test set of points.

In accordance with some implementations of the present disclosure, a hybrid mapping is provided in which different transformation techniques are applied to respective different ranges of raw anomaly scores. The hybrid mapping performs data size aware transformation of raw anomaly scores. The data size aware transformation is dependent upon a relationship of a size of a training set of points and a size of a test set of points. A "size" of a set of points refers to a quantity of points in the set (i.e., how many points are in the set). By performing the data size aware transformation, the probability of observing an anomaly in a certain range of anomaly scores remains consistent between the training set of points and the test set of points.

FIG. 1 is a block diagram of an example computing environment that includes a number of entities 102, including users, machines, and/or programs (a program includes machine-readable instructions). Activities of the entities 102 produce raw event data 104 that represent events 106 that have occurred in the computing environment.

Examples of events can include any or some combination of the following: login events (e.g., events relating to a number of login attempts and/or devices logged into); events relating to access of resources such as websites, files, machines, programs, etc.; events relating to submission of queries such as Domain Name System (DNS) queries; events relating to sizes and/or locations of data (e.g., files) accessed; events relating to loading of programs; events relating to execution of programs; events relating to accesses made of components of the computing environment; events relating to accessing cloud services; errors reported by machines or programs; events relating to performance monitoring or measurement of various characteristics of the computing environment (including monitoring of network communication speeds, execution speeds of programs, etc.), and/or other events.

Data relating to events can be collected as event data records (also referred to as "data points" or simply "points"), which are part of the event data 104. An event data record (or "point") can include a number of features, such as a time feature (to indicate when the event occurred or when the event data record was created or modified). Further features of an event data record can depend on the type of event that the event data record represents. For example, if an event data record is to represent a login event, then the event data record can include a time feature to indicate when the login occurred, a user identification feature to identify the user making the login attempt, a resource identification feature to identify a resource in which the login attempt was made, and so forth. For other types of events, an event data record can include other features.

The event data 104 can include any or some combination of the following types of data: network event data, host event data, application data, and so forth.

Network event data is collected on a network device such as a router, a switch, or other network device that is used to transfer or otherwise communicate data between other devices. Examples of network event data include Hypertext Transfer Protocol (HTTP) data, DNS data, Netflow data (which is data collected according to the Netflow protocol), and so forth.

Host event data can include data collected on computers (e.g., desktop computers, notebook computers, tablet computers, server computers, etc.), smartphones, Internet-of-Things (IoT) devices, or other types of electronic devices. Host event data can include information of processes, files, operating systems, and so forth, collected in computers.

Application data can include data produced by application programs, such as logs of the activities of a Web server or DNS server or other application programs such as database programs, spreadsheet programs, program development and monitoring tools, word processing programs, and so forth.

The computing environment also includes an anomaly detector or multiple anomaly detectors 108. An anomaly detector 108 is able to produce an anomaly score based on a number of features that are part of a point (also referred to as "an event data record" above). Information of the event data records 104 can be used to populate both a training data set 110 and a test data set 112.

An anomaly detector 108 generates a corresponding anomaly score, which is a raw anomaly score, based on points in the training data set 110 or the test data set 112.

In the ensuing discussion, reference is made to multiple anomaly detectors 108. The anomaly detectors 108 can be different types of anomaly detectors that apply different anomaly detection techniques, in some examples. In other examples, just one anomaly detector 108 can be employed.

The anomaly detectors 108 can be trained using a training data set 110, where the training data set 110 also includes points corresponding to events. If unsupervised learning is used, the points of the training data set 110 do not include associated anomaly scores (labels assigned to the points). If supervised learning is used, the points of the training data set 110 can include associated anomaly scores (labels), which may have been previously collected for the computing environment, a different computing environment, or multiple computing environments. The points of the test data set 112 correspond to events detected during operation of the computing environment, and which is to be subjected to anomaly detection.

In accordance with some implementations of the present disclosure, a transformation mapping creation engine 114 is able to create a hybrid mapping 116 for mapping raw anomaly scores based on outputs of the anomaly detectors 108 and transformed anomaly scores.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

An anomaly scoring engine 118 uses the hybrid mapping 116 to produce transformed anomaly scores 119 based on raw anomaly scores 113 output by the anomaly detectors 108 based on the test data set 112.

The transformed anomaly scores 119 can be sent to a user console 120, which can include a user device such as a desktop computer, a notebook computer, a tablet computer, a smartphone, and so forth. The user console 120 can display a user interface (UI) 122, in which the transformed anomaly scores 119 (or a report or summary based on the transformed anomaly scores) can be displayed. The report or summary displayed in the UI 122 can be in text form, graphical form, or in any other form. An analyst using the user console 120 can review the information displayed in the UI 122 to determine whether or not anomalies are present in the computing environment.

In other examples, the anomaly scoring engine 118 can output the transformed anomaly scores 119 to an anomaly detection engine 124. The anomaly detection engine 124 can use the transformed anomaly scores 119 to detect whether anomalies are present in the event data 104. If anomalies are detected, then the anomaly detection engine 124 can provide information identifying the detected anomalies to an anomaly resolution engine 126.

The anomaly resolution engine 126 can respond to information identifying a detected anomaly by performing a countermeasure to address the anomaly. A "countermeasure" can refer to a remedial action, or a collection of remedial actions, that can be performed to address an anomaly. Examples of countermeasures that can be performed include any of the following: causing a firewall to allow certain communications while blocking other communications, causing an intrusion detection system to detect unauthorized intrusion of a system and to disable access in response to the intrusion detection, causing a disabling system to shut down a device, cause a system to prevent communication by a device within a network, cause a device to shut down or stop or pause a program in the device, cause an anti-malware tool to scan a device or a network for identifying malware and to either remove or quarantine the malware, and so forth.

The hybrid mapping 116 produced by the transformation mapping creation engine 114 can include multiple different mappings derived using different transformation techniques. In some examples, the multiple mappings are to be applied to raw anomaly scores 113 produced based on outputs of the anomaly detectors 108 and respective different ranges of raw anomaly scores. For example, the hybrid mapping 116 can include a first mapping between raw anomaly scores in a first range and first transformed anomaly scores, a second mapping between raw anomaly scores in a second range (that is greater than the first range), and second transformed anomaly scores. In some examples, the first mapping can include a first linear mapping that linearly maps raw anomaly scores in the first range to corresponding transformed anomaly scores. The second mapping can include either a linear mapping or a non-linear mapping (discussed further below).

Although the foregoing example refers to a first mapping and a second mapping that is part of the hybrid mapping 116, there can be more than two mappings in the hybrid mapping 116 in other examples.

Details regarding different mappings of the hybrid mapping 116 are discussed further below.

In some examples, an anomaly detector (108) can generate a probability that indicates the anomalousness of an event or an entity, expressed as:

$$P(\text{entity behavior}|\text{context}), \quad (\text{Eq. 1})$$

where both entity behavior and context is represented by a number of features. In Eq. 1, entity behavior can include feature(s) that represent a behavior or action of an entity, and context can include feature(s) can represent a context in which the behavior or action occurred, such as time of day, location, and so forth. Collectively, entity behavior and context can be part of an event data record in the event data 104 shown in FIG. 1.

A probability computed according to Eq. 1 can be considered to be equivalent to a probability of an anomaly (in the sense that the higher the probability of an event or entity, the more normal it is; and conversely, the lower the probability of an event or entity, the more anomalous it is). In some examples, probabilities computed according to Eq. 1 may include relatively small values for normal behavior and may span multiple orders of magnitude. In some examples, a transformation can be applied to the probabilities to address issues associated with small values of the probabilities and the wide span of possible values. The transformation also converts a probability to an anomaly score. One such transformation includes the computation of the negative log of the probability calculated by the anomaly detector (108) to produce the raw anomaly score (113). Eq. 2 below expresses an example of a negative log:

$$S_{ij} = -\log(P(F_{ij}|\text{context})), \quad (\text{Eq. 2})$$

where $S_{ij}$ is the raw anomaly score (113) for event or entity i for time period j, and $F_1$ is the corresponding event or entity feature (or feature set). Since the probability $P(\ldots) \in [0,1]$, $S_{ij} \in [0, \infty]$, where 0 corresponds to no anomaly and higher positive values relate to more severe (rarer) anomalies.

From the perspective of an analysis entity analyzing anomaly scores (such as a security analyst at the user console 120 of FIG. 1 or the anomaly detection engine 124 of FIG. 1), it may be desirable to upper bound the raw anomaly score, such that the raw anomaly score falls within a more finite range, such as between 0 and 100 (or more generally, in a range between LB and UB, where LB can be any specified lower bound value and UB can be any specified upper bound value). Upper bounding raw anomaly scores can allow mapping between the raw anomaly scores and respective represented severities of anomalies to be more consistent.

The upper bounding can be performed by empirically determining the lower bound for $P(F_{ij}|\text{context})$, computing the corresponding anomaly score ($S_{max}$), and linearly mapping the anomaly score $[0, S_{max}]$ to $[0, 100-\text{margin}]$, that is, $S' = (100-\text{margin}) * S / S_{max}$. In the foregoing, margin represents a pre-specified value to leave a margin for additional mappings of raw anomaly scores. Since anomaly scores may not be uniformly distributed, naively linearly mapping raw anomaly scores to a bounded range may cause too few or too many anomalies having scores close to 100 (or another specified upper bound) in the results presented to an analysis entity.

Instead of just naively performing a linear mapping from raw anomaly scores (such as computed according to Eq. 2) to a bounded range, e.g., [0,100] or another range between LB and UB, techniques or mechanisms according to some implementations of the present disclosure can linearly map a raw anomaly score to [0, 100] (or more generally, [LB, UB]) such that the probability of observing one or more anomaly scores greater that a threshold value (Q) is $P_1$ (e.g., 50% or 0.5, or another pre-specified probability value). The threshold value (Q) is pre-specified or set by some entity (a user, a machine, or a program).

To perform this mapping robustly for producing the hybrid mapping 116, to handle a test data set 112 of any size, techniques or mechanisms according to some implementations of the present disclosure map the $k^{th}$ highest raw anomaly score ($S_k$) observed in the training data set 110 to Q rather than the highest raw anomaly score observed in the training data set 110. The value of parameter k is determined based on test data set size and $P_1$, as discussed below.

By performing the mapping discussed above, raw anomaly score(s) of a test data set (which is produced by the anomaly detectors 108 during actual operation of a computing environment, i.e., during production), that is (are) not observed in the training data set 110 used for producing the hybrid mapping 116 can be accounted for. More intuitively, the mapping according to some implementations leave room for unexpectedly high raw anomaly scores during actual operation, by mapping the $k^{th}$ highest raw anomaly score observed in the training data set 110 to Q.

Mapping to the $k^{th}$ highest value can have another benefit. The probability of observing data points above Q in the test data set is $P_1$ after the transformation. Without this transformation, depending on the size of the test data set, there may be too few or too many points above Q.

For example, assume the bounded range is [0, 100], and Q=80, then the linear mapping maps raw anomaly scores in the training data set 110 that are less than $S_k$ in the range between 0 and Q=80, and leaves room in the higher range between Q=80 and 100 for mapping of raw anomaly scores in a test training set (during production) that are not seen in the training date set 110.

Before describing the hybrid mapping 116 in further detail, the following lists various notations.

$P_1$: probability of observing at least one anomalous point having a raw anomaly score greater than Q in a test data set.

Q: anomaly score threshold.

N: number of points in the training data set 110.

r: ratio of a size of the training data set to a size of a test data set, that is, $$r = \frac{\text{training set size}(N)}{\text{test set size}}.$$

The test data set can include points collected over a time interval, such as one day, two days, one week, and so forth. The size of the test data set chosen can be based on which of the time intervals is most likely to be frequently used. Multiple test data set sizes (time intervals) can also be selected, with an anomaly score computed for each of the selected time intervals.

$x_i$: $i^{th}$ point in the training set. It can be assumed that the points are sorted by their anomaly scores, that is, the point $x_1$ has the highest anomaly score in the training data set, and the point $x_N$ has the lowest anomaly score.

$S_i$: anomaly score of point $x_i$ in the training data set; $S_1$ is the highest anomaly score in the training data set.

$S_i^n$: normalized anomaly score of point $x_i$, which is the mapped anomaly score produced from a raw anomaly score based on the hybrid mapping 116.

To calculate a transformed anomaly score $S_i^n$ (also referred to as a "normalized score"), a particular value of k is chosen to linearly map $[0, S_k]$ to the range [0, Q]. The mapping ($\mathcal{M}$) to all points $x_i$ can be extrapolated as follows:

$$\mathcal{M}: S_i^n = \left[ Q \times \frac{S_i}{S_k} \right]. \quad \text{(Eq. 3)}$$

The mapping ($\mathcal{M}$) (e.g., the hybrid mapping 116 of FIG. 1) is the mapping from a raw anomaly score $S_i$ to the normalized anomaly score $S_i^n$.

The probability of the normalized score $S_i^n$ of a point $x_i$ being at least Q for the training data set follows directly from the definition above:

$$P(S_i^n \geq Q \mid \mathcal{M}) = \frac{k}{N}. \quad \text{(Eq. 4)}$$

To determine k, the probability of having at least one point greater than Q in the test data set (with size N/r) is computed as:

$$P(S_i^n \geq Q \text{ such that } |S_i^n| \geq 1) = 1 - \left(1 - \frac{k}{N}\right)^{N/r} \approx 1 - e^{-\frac{k}{r}}. \quad \text{(Eq. 5)}$$

The approximation in Eq. 5 follows from assuming N>>k and using the following relationship:

$$\lim_{N \to \infty} \left(1 - \frac{k}{N}\right)^{N/r} = e^{-\frac{k}{r}}. \quad \text{(Eq. 6)}$$

Solving the following equation for k yields the value of k:

$$P_1 = 1 - e^{-\frac{k}{r}}, \quad \text{(Eq. 7)}$$

or:

$$k = -r \log(1 - P_1). \quad \text{(Eq. 8)}$$

Once the value of k is calculated, a normalization formula for score normalization (the hybrid mapping 116) can be derived. The normalization formula follows the mapping on the $[0, S_k]$ interval. Outside the interval, that is, $[S_k, S_1]$ (note that $S_1$ is the highest anomaly score in the training data set), various alternative techniques can be used. In some examples, three of the techniques are discussed below.

Technique 1: Linear Extrapolation with Clip

With technique 1, for raw anomaly scores $S_i$ less than $S_k$ (e.g., in the range $[0, S_k]$), the following linear mapping is used to generate normalized anomaly scores $S_i^n$:

$$S_i^n = \left[ Q \times \frac{S_i}{S_k} \right]. \quad \text{(Eq. 9)}$$

For raw anomaly scores $S_i$ larger than $S_k$ (i.e., raw anomaly scores in the range $[S_k, S_1]$), the same linear mapping as expressed in Eq. 9 for the range $[0, S_k]$ can be used, except with clipping applied to bound a maximum normalized anomaly score at a specified maximum value, e.g., 100 or a different value.

Eq. 10 below expresses use of the linear mapping of Eq. 9 for raw anomaly scores $S_i$ until $S_1$. However, any raw anomaly score at or greater than the the highest anomaly score $S_1$ in the training data set is clipped at 100 (or some other upper bound). Thus, the normalization mapping (e.g., the hybrid mapping 116 of FIG. 1) for the entire range of raw anomaly scores becomes:

$$S_i^n = \min\left(\left\lceil Q \times \frac{S_i}{S_k}\right\rceil, 100\right). \quad \text{(Eq. 10)}$$

With technique 1, for raw anomaly scores $S_i$ less than $S_k$, the hybrid mapping 116 uses a first mapping (e.g., the linear mapping of Eq. 9). However, for raw anomaly scores $S_i$ larger than $S_k$, the hybrid mapping 116 of technique 1 uses a second mapping, which is the linear mapping with clipping applied.

Technique 2: New Linear Segment

Alternatively, technique 2 applies a different mapping for raw anomaly scores $S_i$ larger than $S_k$.

Eq. 11 below expresses the hybrid mapping 116 of technique 2:

$$S_i^n = \begin{cases} \left\lceil Q \times \frac{S_i}{S_k}\right\rceil, & S_i \leq S_k \\ \left\lceil 100 - \frac{(100-Q)(S_1-S_i)}{S_1-S_k}\right\rceil, & S_i \geq S_k \end{cases} \quad \text{(Eq. 11)}$$

In Eq. 11, for raw anomaly scores $S_i$ less than $S_k$, a first mapping is used, which is the linear mapping of Eq. 9 is used. However, for raw anomaly scores $S_i$ larger than $S_k$ (in the range $[S_k, S_1]$), the hybrid mapping 116 of technique 2 (as expressed in Eq. 11) uses the following second mapping:

$$\left\lceil 100 - \frac{(100-Q)(S_1-S_i)}{S_1-S_k}\right\rceil.$$

The linear mapping used in the second mapping for the range $[S_k, S_1]$ is different from the linear mapping used in the first mapping for the range $[0, S_k]$. The first mapping linearly maps $[0, S_k]$ to $[0, Q]$ using $$\left\lceil Q \times \frac{S_i}{S_k}\right\rceil,$$

and the second mapping linearly maps $[S_k, S_1]$ to $[Q, 100]$ using $$\left\lceil 100 - \frac{(100-Q)(S_1-S_i)}{S_1-S_k}\right\rceil.$$

Technique 3: Sigmoid Segment

As yet a further example, in technique 3, the second mapping can include a sigmoid mapping.

Eq. 12 below expresses the hybrid mapping 116 of technique 3:

$$S_i^n = \begin{cases} \left\lceil Q \times \frac{S_i}{S_k}\right\rceil, & S_i \leq S_k \\ \left\lceil \frac{2(100-Q)}{1+e^{-c(S_i-S_k)}} + 2Q - 100\right\rceil, & S_i \geq S_k \end{cases} \quad \text{(Eq. 12)}$$

In Eq. 12, for raw anomaly scores $S_i$ less than $S_k$ (in the range $[0, S_k]$), a first mapping uses the linear mapping of Eq. 9. However, with technique 3, the second mapping for the range $[S_k, S_1]$ uses the following sigmoid mapping expressed in Eq. 12:

$$\left\lceil \frac{2(100-Q)}{1+e^{-c(S_i-S_k)}} + 2Q - 100\right\rceil.$$

The sigmoid mapping is an example of a nonlinear mapping that can be applied for the range $[S_k, S_1]$. In other examples, other types of nonlinear mappings can be used for the range $[S_k, S_1]$.

Figure 2:
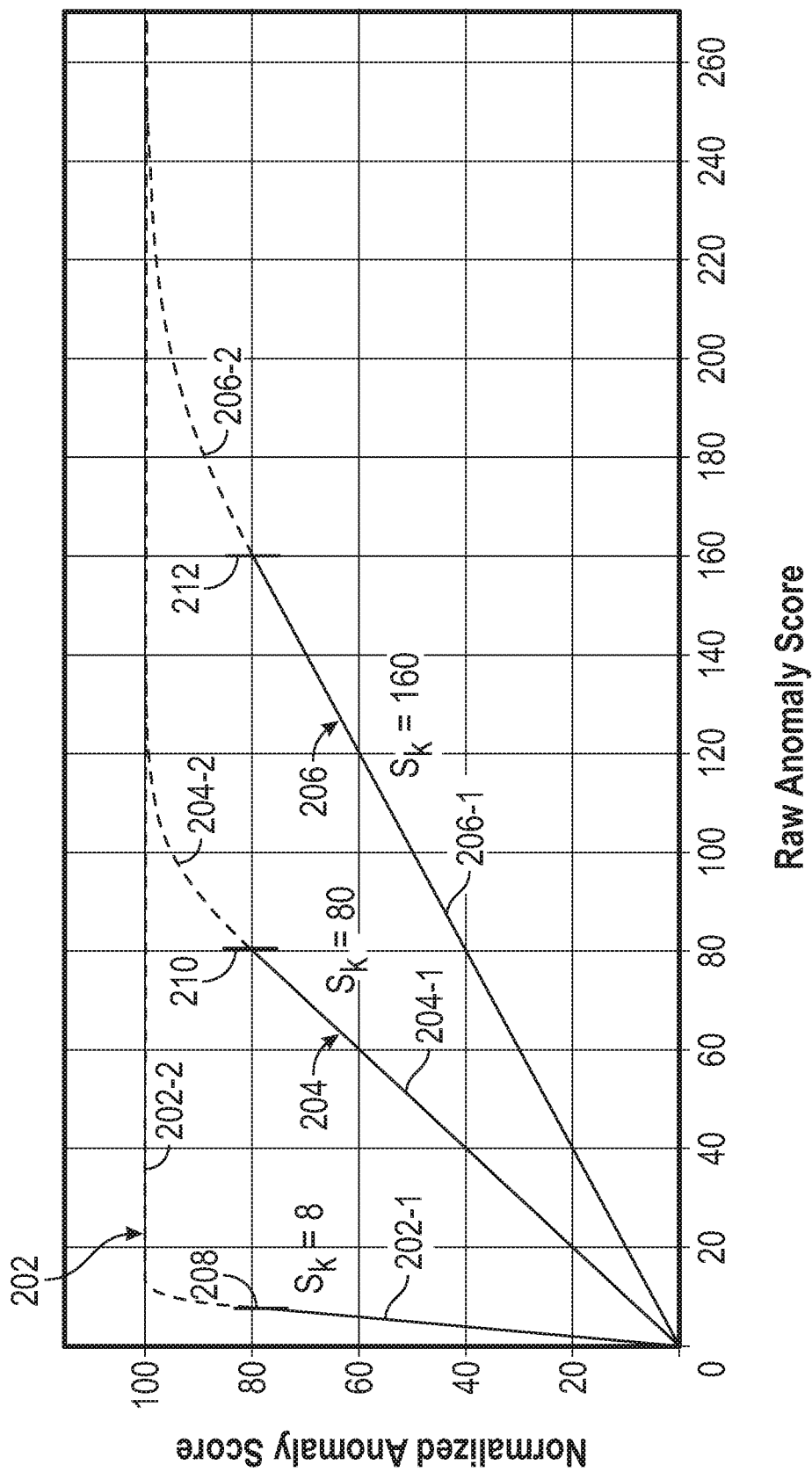
FIG. 2 is a graph showing a hybrid mapping according to some examples.

FIG. 2 is a graph showing examples of use of a linear mapping and sigmoid mapping for different raw anomaly score ranges. A curve 202 represents the hybrid mapping 116 based on technique 3 for $S_k=8$, a curve 204 represents the hybrid mapping 116 based on technique 3 for $S_k=80$, and a curve 206 represents the hybrid mapping 116 based on technique 3 for $S_k=160$.

The curve 202 has a first segment 202-1 that represents the linear mapping for $S_i \leq S_k$, and a second segment 202-2 that represents the sigmoid mapping for $S_i \geq S_k$. The boundary between the first segment 202-1 and the second segment 202-2 is represented as 208. The curve 204 has a first segment 204-1 that represents the linear mapping for $S_i \leq S_k$, and a second segment 204-2 that represents the sigmoid mapping for $S_i \geq S_k$. The boundary between the first segment 204-1 and the second segment 204-2 is represented as 210. The curve 206 has a first segment 206-1 that represents the linear mapping for $S_i \leq S_k$, and a second segment 62 that represents the sigmoid mapping for $S_i \geq S_k$. The boundary between the first segment 206-1 and the second segment 206-2 is represented as 212.

While the two segments of $S_i^n$ for Eq. 12 are continuous, the two segments may not be smooth at the transition point ($S_k$), as represented by 208, 210, or 212. In fact, the transition point may not be smooth unless $S_i^n = S_i$. To ensure smoothness, the value of c in Eq. 12 is adjusted such that the derivatives of the two segments match at $S_k$.

$$\frac{dS_i^n}{dS_i} = \begin{cases} \frac{Q}{S_k}, & S_i \leq S_k \\ \frac{2c(100-Q)e^{-c(S_i-S_k)}}{(1+e^{-c(S_i-S_k)})^2}, & S_i \geq S_k \end{cases} \quad \text{(Eq. 13)}$$

At $S_i = S_k$:

$$\left.\frac{dS_i^n}{dS_i}\right|_{S_i=S_k} = \begin{cases} \frac{Q}{S_k} \\ \frac{c(100-Q)}{2}. \end{cases} \quad \text{(Eq. 14)}$$

Equating the derivatives provides the value of c:

$$c = \frac{2Q}{S_k(100-Q)}. \quad \text{(Eq. 15)}$$

Thus the final expression for the normalized score, $S_i^n$, in technique 3 can become:

$$S_i^n = \begin{cases} \left[Q \times \dfrac{S_i}{S_k}\right], & S_i \le S_k \\ \left[\dfrac{2(100-Q)}{1+e^{-\dfrac{2Q(S_i-S_k)}{S_k(100-Q)}}} + 2Q - 100\right], & S_i \ge S_k \end{cases} \quad \text{(Eq. 16)}$$

Figure 3:
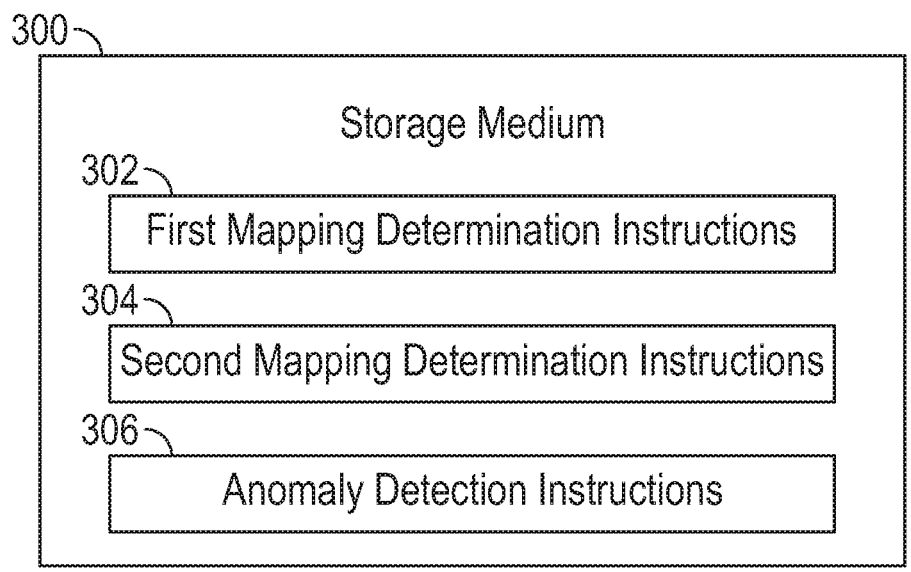
FIG. 3 is a block diagram of a storage medium storing machine-readable instructions according to some examples.

FIG. 3 is a block diagram of a non-transitory machine-readable storage medium storing machine-readable instructions that upon execution cause a system to perform various tasks.

The machine-readable instructions include first mapping determination instructions 302 to, given an anomaly score threshold (e.g., Q) over which at least one anomalous point (including a feature or multiple features of an event or entity) is to be observed in a test set of points (e.g., 112) with a specified probability (e.g., $P_1$), determine, using raw anomaly scores ($S_i$) for a training set of points (e.g., 110), a first mapping between raw anomaly scores in a first range (e.g., $[0, S_k]$) and first transformed anomaly scores using a first transformation technique. A test set can refer to a set of points collected in an actual system (production system) with respect to which an analysis entity wishes to determine if anomalous behavior is present.

In some examples, the raw anomaly scores for the training set of points are based on scores produced by at least one anomaly detector trained on the training set of points.

Each point of the training set of points includes a number (e.g., 1 or greater than 1) of features corresponding to an event in the computing environment, and each point of the test set of points includes a number (e.g., 1 or greater than 1) of features corresponding to an event in the computing environment.

The machine-readable instructions further include second mapping determination instructions 304 to determine, using the raw anomaly scores for the training set of points, a second mapping between raw anomaly scores in a second range (e.g., $[S_k, S_1]$) greater than the first range and second transformed anomaly scores using a second transformation technique different from the first transformation technique. The first mapping and the second mapping can bound a maximum transformed score at a specified maximum value.

Generally, the first range is between a first anomaly score and a second anomaly score mapped to the anomaly score threshold, and the second range is between the second anomaly score and a third anomaly score greater than the second anomaly score. The first anomaly score can be a minimum anomaly score in the training set of points, and the third anomaly score can be a highest anomaly score in the training set of points. For example, the second anomaly score is a $k^{th}$ highest anomaly score for the training set of points, the $k^{th}$ highest anomaly score mapped to the anomaly score threshold, where k is based on the specified probability and a relationship (e.g., a ratio) between a size of the training set of points and a size of the test set of points.

The first and second mappings can include those of any of techniques 1, 2, or 3 discussed above, for example.

The machine-readable instructions further include anomaly detection instructions 306 (which can be part of the anomaly detection engine 124, for example) to use the first mapping and the second mapping to detect an anomaly in a computing environment based on the test set of points.

Figure 4:
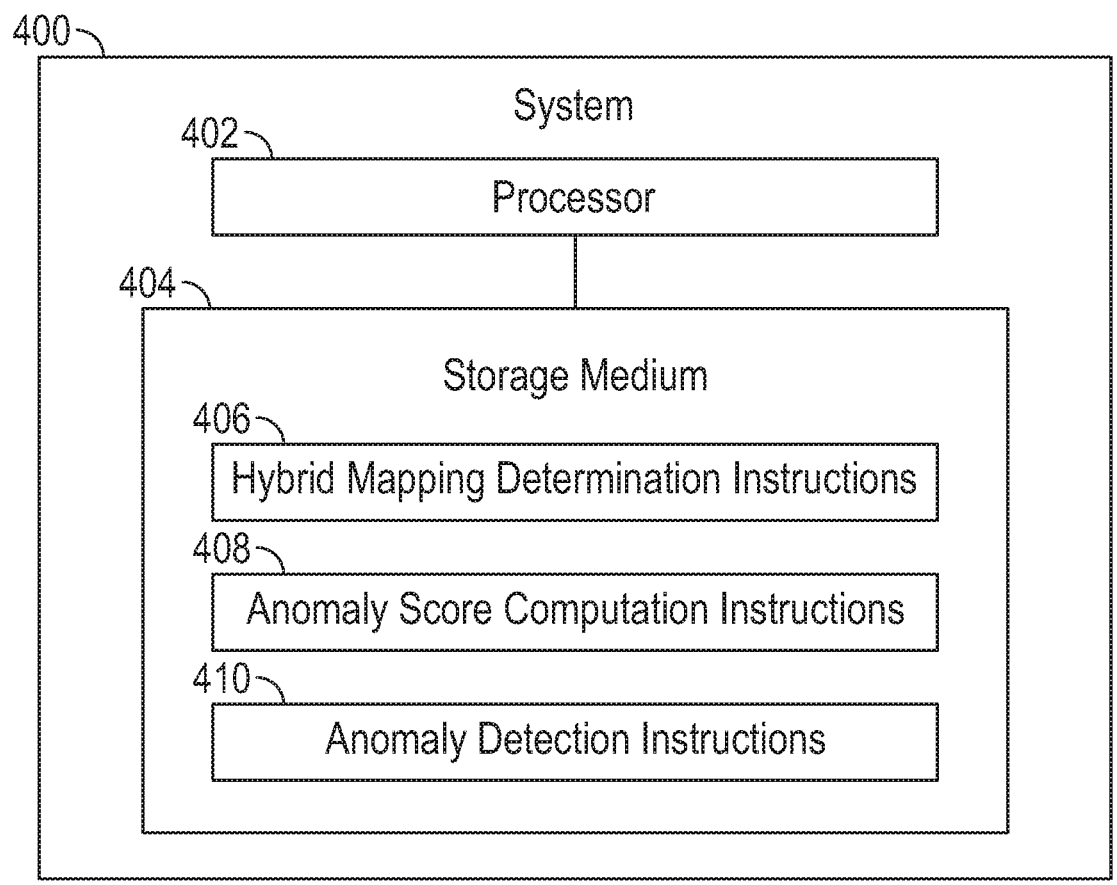
FIG. 4 is a block diagram of a system according to some examples.

FIG. 4 is a block diagram of a system 400 (implemented with a computer or multiple computers) that includes a hardware processor 402 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 400 further includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions include hybrid mapping determination instructions 406 to determine a hybrid mapping between raw anomaly scores and transformed anomaly scores, the raw anomaly scores based on outputs of at least one anomaly detector trained on a training set of points, and the hybrid mapping comprising a plurality of mappings derived using different transformation techniques.

The machine-readable instructions further include anomaly score computation instructions 408 to compute, using the hybrid mapping, anomaly scores for a test set of points corresponding to events in a computing environment, wherein the plurality of mappings are applied to different ranges of the anomaly scores for the test set of points.

The machine-readable instructions further include anomaly detection instructions 410 to detect an anomaly in the computing environment based on the computed anomaly scores.

FIG. 5 is a flow diagram of a process 500 according to some examples. The process 500 includes given an anomaly score threshold over which at least one anomalous point is to be observed in a test set of points with a specified probability, determining (at 502) a first mapping between raw anomaly scores in a first range for a training set of points and first transformed anomaly scores using a first transformation technique, wherein each point of the test set of points comprises a number of features corresponding to an event in a computing environment.

The process 500 includes determining (at 504) a second mapping between raw anomaly scores in a second range greater than the first range for the training set of points and second transformed anomaly scores using a second transformation technique different from the first transformation technique.

The process 500 includes using (at 506) the first mapping and the second mapping to detect an anomaly in the computing environment based on the test set of points.

A storage medium (e.g., 300 of FIG. 3 or 404 of FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that, upon execution, cause a system to:
given an anomaly score threshold over which at least one anomalous point is to be observed in a test set of points with a specified probability, determine, using raw anomaly scores for a training set of points, a first mapping between raw anomaly scores in a first range and first transformed anomaly scores using a first transformation technique, wherein the first range is between a minimum anomaly score and the anomaly score threshold;
determine, using the raw anomaly scores for the training set of points, a second mapping between raw anomaly scores in a second range greater than the first range and second transformed anomaly scores using a second transformation technique different from the first transformation technique; and
use the first mapping and the second mapping to detect an anomaly in a computing environment based on the test set of points.

2. The non-transitory machine-readable storage medium of claim 1, wherein the anomaly score threshold is a $k^{th}$ highest anomaly score for the training set of points, the $K^{th}$ highest anomaly score mapped to the anomaly score threshold, where k is based on a relationship between a size of the training set of points and a size of the test set of points.

3. The non-transitory machine-readable storage medium of claim 2, where k is further based on the specified probability.

4. The non-transitory machine-readable storage medium of claim 1, wherein the first mapping includes a first linear mapping.

5. The non-transitory machine-readable storage medium of claim 4, wherein the second mapping includes the first linear mapping with clipping applied to bound a maximum transformed anomaly score at a specified maximum value.

6. The non-transitory machine-readable storage medium of claim 4, wherein the second mapping includes a second linear mapping different from the first linear mapping.

7. The non-transitory machine-readable storage medium of claim 4, wherein the second mapping includes a nonlinear mapping.

8. The non-transitory machine-readable storage medium of claim 7, wherein the nonlinear mapping includes a sigmoid mapping.

9. The non-transitory machine-readable storage medium of claim 1, wherein the raw anomaly scores for the training set of points are based on scores produced by at least one anomaly detector trained on the training set of points.

10. The non-transitory machine-readable storage medium of claim 9, wherein the raw anomaly scores for the training set of points are based on a negative log of the raw anomaly scores produced by the at least one anomaly detector.

11. The non-transitory machine-readable storage medium of claim 1, wherein the first mapping and the second mapping bound a maximum transformed anomaly score at a specified maximum value.

12. The non-transitory machine-readable storage medium of claim 1, wherein each point of the training set of points includes a number of features corresponding to an event in the computing environment, and each point of the test set of points includes a number of features corresponding to an event in the computing environment.

13. A system comprising:
a processor; and
a non-transitory storage medium storing instructions executable on the processor to:
determine a hybrid mapping between raw anomaly scores and transformed anomaly scores, the raw anomaly scores being based on outputs of at least one anomaly detector trained on a training set of points, and the hybrid mapping comprising a plurality of mappings derived using different transformation techniques;
compute, using the hybrid mapping, anomaly scores for a test set of points corresponding to events in a computing environment, wherein the plurality of mappings are applied to different ranges of the anomaly scores for the test set of points, wherein a first range is between a minimum anomaly score and an anomaly score threshold, and wherein a second range is greater than the first range; and
detect an anomaly in the computing environment based on the computed anomaly scores.

14. The system of claim 13, wherein the plurality of mappings comprise a first linear mapping to be applied to raw anomaly scores in a first range of raw anomaly scores, and a second mapping to be applied to raw anomaly scores in a different second range of raw anomaly scores.

15. The system of claim 14, wherein the second mapping comprises the first linear mapping with clipping applied to bound a maximum transformed anomaly score at a specified maximum value.

16. The system of claim 14, wherein the second mapping includes a second linear mapping different from the first linear mapping.

17. The system of claim 14, wherein the second mapping includes a nonlinear mapping.

18. The system of claim 14, wherein the anomaly score threshold is a $k_{th}$ highest anomaly score for the training set of points, the $k^{th}$ highest anomaly score mapped to the anomaly score threshold, where k is based on a relationship between a size of the training set of points and a size of the test set of points.

19. A method of a system comprising a hardware processor, comprising:
given an anomaly score threshold over which at least one anomalous point is to be observed in a test set of points with a specified probability, determining a first mapping between raw anomaly scores in a first range for a training set of points and first transformed anomaly scores using a first transformation technique, wherein the first range is between a minimum anomaly score and the anomaly score threshold;
determining a second mapping between raw anomaly scores in a second range greater than the first range for the training set of points and second transformed anomaly scores using a second transformation technique different from the first transformation technique; and using the first mapping and the second mapping to detect an anomaly in a computing environment based on the test set of points.

20. The method of claim 19, wherein each point of the test set of points comprises a number of features corresponding to an event in the computing environment.

* * * * *